US009576571B2

(12) United States Patent
Stewart et al.

(10) Patent No.: US 9,576,571 B2
(45) Date of Patent: *Feb. 21, 2017

(54) METHOD AND APPARATUS FOR RECOGNIZING AND REACTING TO USER PERSONALITY IN ACCORDANCE WITH SPEECH RECOGNITION SYSTEM

(71) Applicant: Nuance Communications, Inc., Burlington, MA (US)

(72) Inventors: Osamuyimen Thompson Stewart, Piscataway, NJ (US); Liwei Dai, Catonsville, MD (US)

(73) Assignee: Nuance Communications, Inc., Burlington, MA (US)

( * ) Notice: Subject to any disclaimer, the term of this patent is extended or adjusted under 35 U.S.C. 154(b) by 305 days.

This patent is subject to a terminal disclaimer.

(21) Appl. No.: 14/268,351

(22) Filed: May 2, 2014

(65) Prior Publication Data

US 2014/0244260 A1    Aug. 28, 2014

Related U.S. Application Data

(63) Continuation of application No. 12/055,952, filed on Mar. 26, 2008, now Pat. No. 8,719,035, which is a
(Continued)

(51) Int. Cl.
*G06F 17/27* (2006.01)
*G10L 15/00* (2013.01)
(Continued)

(52) U.S. Cl.
CPC ............. *G10L 15/08* (2013.01); *G10L 17/26* (2013.01); *G10L 25/63* (2013.01); *G06F 17/2785* (2013.01)

(58) Field of Classification Search
CPC .......... G10L 25/00; G10L 25/63; G10L 25/66; G10L 25/48; G10L 15/00; G10L 15/18; G10L 15/08; G10L 15/16; G10L 2015/00; G06F 17/20; G06F 17/21; G06F 17/27; G06F 17/28; G06F 17/2785
(Continued)

(56) References Cited

U.S. PATENT DOCUMENTS

| 5,617,488 A | 4/1997 | Hong et al. |
| 5,696,981 A | 12/1997 | Shovers |

(Continued)

OTHER PUBLICATIONS

U.S. Patent and Trademark Office Action from U.S. Appl. No. 11/436,295 dated Mar. 10, 2010 (8 pages).
(Continued)

*Primary Examiner* — Paras D Shah
(74) *Attorney, Agent, or Firm* — Wolf, Greenfield & Sacks, P.C.

(57) ABSTRACT

Techniques are disclosed for recognizing user personality in accordance with a speech recognition system. For example, a technique for recognizing a personality trait associated with a user interacting with a speech recognition system includes the following steps/operations. One or more decoded spoken utterances of the user are obtained. The one or more decoded spoken utterances are generated by the speech recognition system. The one or more decoded spoken utterances are analyzed to determine one or more linguistic attributes (morphological and syntactic filters) that are associated with the one or more decoded spoken utterances. The personality trait associated with the user is then determined based on the analyzing step/operation.

9 Claims, 12 Drawing Sheets

Related U.S. Application Data continuation of application No. 11/436,295, filed on May 18, 2006, now Pat. No. 8,150,692.

(51) Int. Cl.
*G10L 25/00* (2013.01)
*G10L 15/08* (2006.01)
*G10L 25/63* (2013.01)
*G10L 17/26* (2013.01)

(58) Field of Classification Search
USPC ........ 704/9, 231, 235–236, 251, 270, 270.1; 434/322, 346, 353, 354, 321, 236, 238, 434/185, 178, 167, 159
See application file for complete search history.

(56) References Cited

U.S. PATENT DOCUMENTS

| | | | |
|---|---|---|---|
| 5,987,415 A | 11/1999 | Breese et al. | |
| 6,151,571 A | 11/2000 | Pertrushin | |
| 6,185,534 B1 | 2/2001 | Breese et al. | |
| 6,212,502 B1 | 4/2001 | Ball et al. | |
| 6,308,151 B1 | 10/2001 | Smith | |
| 6,332,143 B1 | 12/2001 | Chase | |
| 6,721,706 B1 | 4/2004 | Strubbe et al. | |
| 6,757,362 B1 | 6/2004 | Cooper et al. | |
| 6,964,023 B2* | 11/2005 | Maes et al. | 715/811 |
| 7,225,122 B2 | 5/2007 | Shaw | |
| 7,228,122 B2 | 6/2007 | Oyagi et al. | |
| 7,233,900 B2 | 6/2007 | Kariya | |
| 7,298,256 B2 | 11/2007 | Sato et al. | |
| 7,340,393 B2* | 3/2008 | Mitsuyoshi | 704/207 |
| 7,848,920 B2 | 12/2010 | Lewis et al. | |
| 7,957,976 B2 | 6/2011 | Cross, Jr. et al. | |
| 8,073,697 B2 | 12/2011 | Cross, Jr. et al. | |
| 8,145,493 B2 | 3/2012 | Cross, Jr. et al. | |
| 8,150,692 B2 | 4/2012 | Stewart et al. | |
| 8,209,183 B1* | 6/2012 | Patel et al. | 704/270 |
| 8,374,874 B2 | 2/2013 | Cross, Jr. et al. | |
| 8,386,265 B2* | 2/2013 | Subramanian et al. | 704/277 |
| 8,719,035 B2 | 5/2014 | Stewart et al. | |
| 8,725,513 B2 | 5/2014 | Cross, Jr. et al. | |
| 2003/0036899 A1 | 2/2003 | Leslie et al. | |
| 2004/0006459 A1 | 1/2004 | Dehlinger et al. | |
| 2004/0042592 A1 | 3/2004 | Knott et al. | |
| 2004/0199923 A1 | 10/2004 | Russek | |
| 2004/0210661 A1 | 10/2004 | Thompson | |
| 2006/0020473 A1 | 1/2006 | Hiroe et al. | |
| 2006/0122834 A1 | 6/2006 | Bennett | |
| 2006/0129383 A1 | 6/2006 | Oberlander et al. | |

OTHER PUBLICATIONS

Office Action in U.S. Appl. No. 11/436,295 mailed Nov. 16, 2010.
Office Action in U.S. Appl. No. 11/436,295 mailed Aug. 22, 2011.
Notice of Allowance in U.S. Appl. No. 11/436,295 mailed Oct. 31, 2011.
Office Action in U.S. Appl. No. 11/436,295 mailed Mar. 21, 2011 (10 pages).
U.S. Patent and Trademark Office Action from U.S. Appl. No. 12/055,952 dated Jun. 7, 2010 (14 pages).
Office Action dated Nov. 3, 2010 in U.S. Appl. No. 12/055,952.
Notice of Allowance in U.S. Appl. No. 12/055,952 mailed Dec. 18, 2013.
Laurence Devillers et al. "Annotation and Detection of Emotion in a Task-oriented Human-Human Dialog Corpus", ISLE workshop, Edinburgh, Dec. 2002.
Jon Oberlander and Alastair J. Gill, "Individual differences and implicit language: personality, parts-of-speech and pervasiveness", 26.sup.th Conf. Cognitive Science Society, Chicago, 2004, pp. 1035-1040.

* cited by examiner

METHOD AND APPARATUS FOR RECOGNIZING AND REACTING TO USER PERSONALITY IN ACCORDANCE WITH SPEECH RECOGNITION SYSTEM

CROSS-REFERENCE TO RELATED APPLICATION(S)

This application is a continuation of and claims the benefit under 35 U.S.C. §120 of U.S. application Ser. No. 12/055,952, which was filed in the U.S. Patent and Trademark Office on Mar. 26, 2008, which is herein incorporated by reference in its entirety. U.S. application Ser. No. 12/055,952 is a continuation of and claims the benefit under 35 U.S.C. §120 of U.S. application Ser. No. 11/436,295, which was filed in the U.S. Patent and Trademark Office on May 18, 2006, and which is herein incorporated by reference in its entirety.

FIELD OF THE INVENTION

This present invention generally relates to speech recognition systems and, more particularly, to techniques for recognizing and reacting to user personality in accordance with a speech recognition system.

BACKGROUND OF THE INVENTION

It has been argued that users' positive or negative reaction to a speech user interface can be affected by the extent to which they "self-identify" with the persona (voice and human characteristics) of the system. It is generally agreed in the human-computer interaction literature that callers can recognize and react to the emotive content in a speech sample in speech recognition systems.

However, as a converse to the above phenomenon, the question is raised: can computers recognize and react to the emotive content of what a caller says in a speech user interface? The key problem to addressing this question has been how to develop an algorithm with enough "intelligence" to detect the emotion (or persona) of the caller and then adjust its dialog to respond accordingly.

One current solution to this problem is to capture the voice features (pitch/tone or intonation) of the user and run this information through a pitch-synthesis system to determine the user's emotion (or persona). One of the biggest problems with this approach is its inconclusiveness. This is based on the fact that the dimensions or resulting categories of emotion are based on matching pitch characteristics (loud, low, normal) with emotional values such as "happy" or "sad" as well as the indeterminate "neutral."

The problem with using pitch for emotional determination is that emotional values cannot always be based on absolute values. For example, a user may be "happy" but speak in a "neutral" voice, or they may be sad and yet speak in a happy voice. In addition, it is not exactly clear in this existing approach what constitutes a "neutral" voice and how you would go about measuring this across a wide range of user population, demography, age, etc.

SUMMARY OF THE INVENTION

Principles of the present invention provide techniques for recognizing user personality in accordance with a speech recognition system.

For example, in one aspect of the invention, a technique for recognizing a personality trait associated with a user interacting with a speech recognition system includes the following steps/operations. One or more decoded spoken utterances of the user are obtained. The one or more decoded spoken utterances are generated by the speech recognition system. The one or more decoded spoken utterances are analyzed to determine one or more linguistic attributes associated with the one or more decoded spoken utterances. The personality trait associated with the user is then determined based on the analyzing step/operation.

The one or more linguistic attributes may include one or more morphological attributes. The one or more morphological attributes may include a structure of words in the one or more decoded spoken utterances. The one or more morphological attributes may include a type of words in the one or more decoded spoken utterances. The one or more morphological attributes may include the number of words and/or the number of compound words in the one or more decoded spoken utterances.

The one or more linguistic attributes may include one or more syntactic attributes. The one or more syntactic attributes may include a class of speech associated with words in the one or more decoded spoken utterances. The class of speech may include a noun, an adjective, a preposition, a pronoun, an adverb, or a verb.

Further, a subsequent dialog output to the user may be selected based on the determined personality trait.

Still further, the analyzing step/operation may include assigning weights to the one or more linguistic attributes, wherein assignment of the weights corresponds to different possible personality traits.

The technique may include the step/operation of analyzing the one or more decoded spoken utterances to determine one or more personality attributes associated with the one or more decoded spoken utterances such that the step of determining the personality trait associated with the user is based on the one or more linguistic attributes and the one or more personality attributes.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
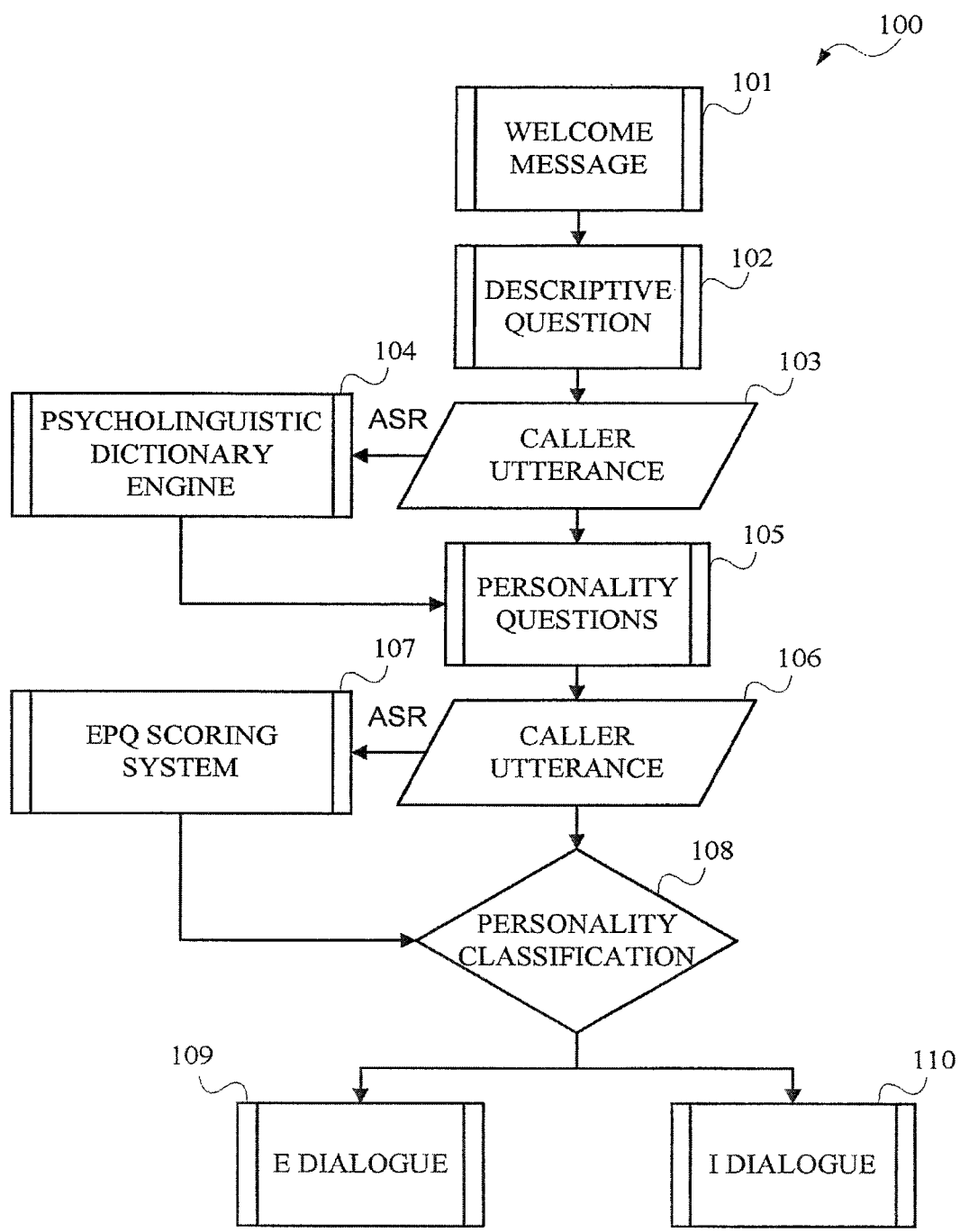
FIG. 1 is a block/flow diagram illustrating a system and process for recognizing and reacting to a user personality, according to an embodiment of the invention.

The following description will illustrate the invention using an exemplary speech recognition system architecture. It should be understood, however, that the invention is not limited to use with any particular speech recognition system architecture. The invention is instead more generally applicable to any speech recognition system in which it would be desirable to recognize and react to user personality.

Illustrative principles of the invention abstract away from the superficial aspect of language such as pitch characteristics and provide a systematic algorithm that is based on primitive or basic aspects of human language such as parts of speech. More particularly, principles of the invention utilize a morphological filter and a syntactic filter to recognize emotion or personality of a user. Based on the personality determination, the system can then determine how to react to that user.

Furthermore, illustrative principles of the invention employ intersecting theories of innateness from linguistics and psychology as the basis for an algorithm for detecting users' emotion in a speech user interface. It is realized that, linguistically, humans are born with an innate predisposition to acquire language, and parts of speech (i.e., the morphology-syntax interface) are assumed to be primitives of language acquisition. From a psychology perspective, personality differences grow out of our genetic inheritance (temperament), and temperament is that aspect of our personality that is innate (genetically-based). Advantageously, using basic aspects of language such as parts of speech, in accordance with illustrative principles of the invention, produces improved personality recognition results as compared with the existing pitch-based approach.

Still further, illustrative principles of the invention are based on the realization that different personality types exhibit major linguistic differences regarding language use. In this regard, illustrative principles of the invention use the two filters mentioned above, i.e., a morphological filter and a syntactic filter, to encode the differences between two major personality types, i.e., extrovert and introvert. How these filters pertain to these two major personality types will now be described.

(a) Morphological filter: This filter determines morphological attributes associated with input speech. Morphological attributes include the structure and type of words that dominate a caller's initial response. The word structure distinctions are:

Extroverts use more words as well as more compound words when responding to the initial dialog of speech recognition system.

Introverts use less words and very few compound words when responding to the initial dialog.

With regard to word type, this may be based on the notion of polysemy which is the linguistic label for when a word has two or more related meanings. Some examples of polysemous words in English are: (1) "bright" which can mean "shining" or "intelligent;" and (2) "glare" which can mean "to shine intensely" or "to stare angrily." Accordingly, extroverts will frequently use one extreme of the related words, like "shine," while introverts will be on the opposite end, like "intelligent," to express the same notion of "bright." This may also apply to the differences in the use of exaggeration (hyperbolic) figure of expression between the two personality types.

(b) Syntactic filter: This filter determines syntactic attributes associated with input speech. Syntactic attributes include the syntactic categories (classes of speech) that dominate the caller's initial response. The more fine-grained distinctions are:

Extroverts prefer to use more nouns, adjectives, and prepositions when responding to the initial dialog of speech recognition system.

Introverts prefer to use pronouns, adverbs and verbs when responding to the initial dialog.

These linguistic attributes are encoded in the grammar of an initial dialog state of the system. These distinctions are assigned specific values encoded in the algorithm for the personality detection and computation. Thus, if in a caller's response a given threshold is reached for one of these linguistic values, then they are associated with the dominant personality type for that trait and then the system changes its dialog to respond accordingly.

An implicit assumption behind basing a personality recognition algorithm on an initial dialog is that a user's natural language (free-form) response to the opening prompt of the system will provide sufficient data for processing via the above-mentioned morphological and syntactic filters. Thus, application of both filters provides weighted attributes such as word structure (compound or not), word class (part of speech), and automatic speech recognition (ASR) count (word count). These filters are applied upfront during the first turn of the dialog (i.e., the initial user utterance) and then the user's personality type is determined, after which the system adjusts its own dialog to suite the personality.

Advantageously, illustrative principles of the invention provide a way for computers to detect users' emotion (personality) without relying on the more erratic and less tractable feature of pitch. Syntax and morphology are assumed to be basic building blocks of language and users are less conscious of word choice even when they talk to a speech-based system.

Before describing illustrative embodiments of a voice user interface that implements principles of the invention in the context of FIGS. 1-4, below we describe a general implementation of a linguistic approach for detecting users' personality, according to illustrative principles of the invention.

1. Design: During a design phase, a voice user interface (VUI) designer writes two sets of prompts that match two personality types, extroversion and introversion, with well known traits. This is localized to the population of users based on who they are and what the application is set up to do.

2. Grammar Implementation: The grammar developer uses the prompts in the VUI specification as the basis for the initial coverage. Thereafter, the morphological and syntactic values are scored by a weighting algorithm, and the relative score associated with each value is used to assign personality type as follows (note that [X] refers to an integer value that is specified for the particular application):

Use more words than [X]=extrovert
Use fewer words than [X]=introvert
Use of compounds more than [X]=extrovert
Use of compounds fewer than [X]=introvert
Use more pronouns than [X]=introvert
Use more verbs than [X] for a relative number of words=introvert
Use more adverbs or locatives than [X]=introvert
Use more nouns than [X]=extrovert
Use more adjectives than [X]=extrovert
Use more prepositions than [X]=extrovert
Use fewer words than [X]=introvert
Use of compounds more than [X]=extrovert
Use of compounds fewer than [X]=introvert 3. Runtime: When the user offers his initial utterance upon entering the system (initial dialog), the initial grammar active in this state compiles using these value-pairs and adds the total score associated with each linguistic value. If the score is greater than [X] and consistent within the subgroups of attributes for a personality type, then the system concludes that caller is of that personality type and will automatically switch to the appropriate prompt.

Here are two use cases as illustrations:

(a) Use case 1: Extroverts will use more words along with more compound words when responding to the initial dialog of speech recognition system.

For example:

System: "Welcome to our speech demo. I am automated persona dialog system.

Please briefly describe the attributes of the type of job that interests you?"

Extrovert: "I want a job where the people are fun, where I can innovate and get to spin-off great new ideas. Something that's hands-on and off-the-charts . . . ."

The algorithm will show:

Caller used more words [greater than 15]

Caller used more compounds [greater than 1]

Conclusion=extrovert (b) Use case 2: Introverts will use less words and very little compounding when responding to the initial dialog.

For example:

System: "Welcome to our speech demo. I am automated persona dialog system.

Please briefly describe the attributes of the type of job that interests you?"

Introvert: "Somewhere fun, I want to innovate, create . . . ."

The algorithm will show caller used fewer words [fewer than [15]]

Caller used less compounds [zero]

Caller used mainly verbs [3]

Caller used locative adverb/pronoun [1]

Conclusion=introvert

A more detailed explanation of such cases will now be described in the context of an illustrative recognition system.

Referring initially to FIG. 1, a block/flow diagram illustrates a system and process for recognizing and reacting to a user personality, according to an embodiment of the invention. It is to be appreciated that the functional blocks/steps may be implemented in a speech recognition system, accessible by one or more users (callers).

It is also to be appreciated that, although not expressly shown, system 100 includes a speech recognition engine for decoding the input speech provided by a caller (e.g., initial dialog, responses to messages, responses to questions, etc.) into text, as well as a text-to-speech engine for synthesizing text (initial dialog, messages, questions, responses, etc.) into speech output by the system. The system may also include a dialog manager for managing the speech recognition engine and the text-to-speech engine. Existing dialog managers, speech recognition engines, and the text-to-speech engines may be employed for these functions. However, principles of the invention are not limited to any particular dialog manager, speech recognition engine, or text-to-speech engine.

It is also assumed that the user (caller) interacts with system 100 via a phone line (e.g., wireless or wired) in accordance with a telecommunication device (e.g., standard telephone, cellular phone, etc.), a network connection (e.g., Internet, private local area network, etc.) over a computing device (e.g., personal computer, laptop, personal digital assistant, etc.), or locally (e.g., via microphone and speaker).

As shown, system 100 provides welcome message 101 to the caller (not shown). It is to be understood that the messages provided by the system are dependent on the application in which the system is being employed.

Following the welcome message, the system poses a descriptive question 102 to the caller. Again, it is to be understood that the questions posed by the system are dependent on the application in which the system is being employed. In the above example, the descriptive question is: "Please briefly describe the attributes of the type of job that interests you?"

In response to the descriptive question, the system captures caller utterance 103. Caller utterance 103 is processed by an automated speech recognition (ASR) system. As mentioned above, the ASR generates a decoded text representation of the caller utterance.

The decoded text representation is applied to psycholinguistic dictionary engine 104. The psycholinguistic dictionary is used to determine the structure and type of words (i.e., applies a morphological filter) that dominate the caller's response (e.g., determination of the number of compound words and the total number of words in the response) and the classes of speech (i.e., applies a syntactic filter) that dominate the caller's response (e.g., determination of nouns, adjectives, prepositions, pronouns, adverbs and verbs used in the response). Thus, morphological values such as the number of compound words and the number of total words, and syntactic values such as the number of nouns, adjectives, prepositions, pronouns, adverbs and verbs, are computed.

These morphological and syntactic values are weighted in the psycholinguistic dictionary and assigned scores, e.g., +1 for extrovert or −1 for introvert. The morphological values and syntactic values (collectively referred to as the linguistic results) are passed onto a personality classification algorithm, described below in step 108, where they are tagged and summarized (along with EPQ scores or personality results described below in the next step) for a total score (aggregate score). This aggregate score is used to make the decision regarding personality type.

Next, the system poses one or more personality questions 105 to the caller. Such questions are tailored to evoke responses that tend to characterize the caller as being an extrovert or an introvert. Examples of such questions will be given below. The caller's utterances 106 are decoded by the ASR. The decoded responses are scored by EPQ (evaluative personality question) scoring system 107. These scores (collectively referred to as the personality results) are also passed onto the personality classification algorithm with the linguistic results.

Personality classification step 108 receives the linguistic results from the psycholinguistic language engine and the personality results from the EPQ scoring system, aggregates them, and interprets them so as to make a determination of whether the caller is an extrovert or an introvert. Based on the determination, the system can continue dialog with the user that is suited to his personality type, i.e., extrovert (E Dialogue 109) or introvert (I Dialogue 110).

Given such an illustrative system framework, FIGS. 2A through 2G and FIGS. 3A through 3C give an example of a voice user interface and methodology that may be employed in accordance with a personality recognition system of FIG. 1.

It is to be appreciated that while the illustrative systems and methodologies described herein (below and above) depict the use of descriptive questions and personality questions, principles of the invention contemplate that a personality trait of a user can advantageously be recognized using only one or more responses to one or more descriptive questions, wherefrom morphological and syntactic attributes are determined, as described above. That is, the personality questions may be used merely to supplement the accuracy of the personality determination result.

Also, it is to be appreciated that the content of various questions and responses output by the system described below are for purposes of illustration only, and thus it is to be understood that such content is application-dependent.

Figure 2A:
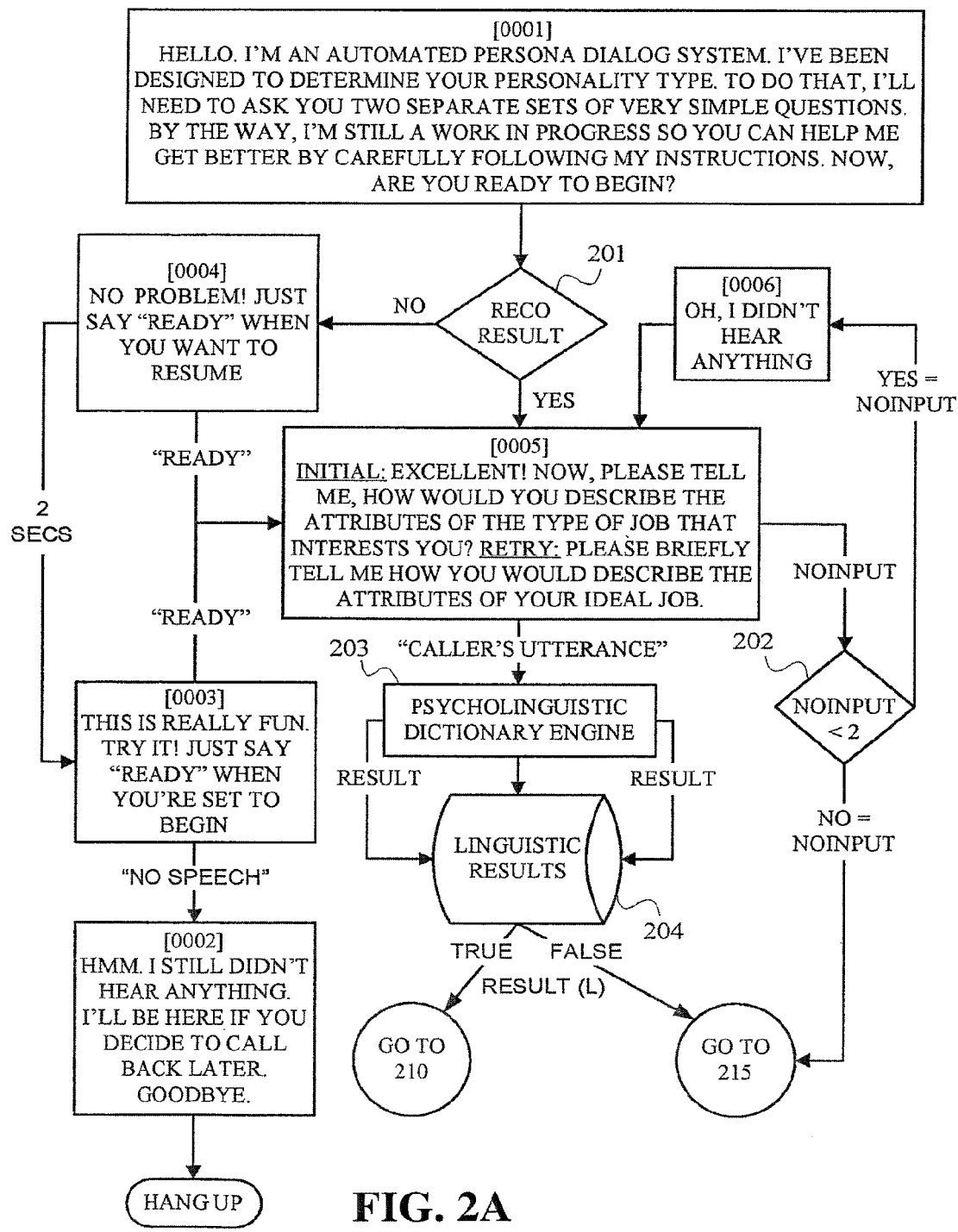
FIGS. 2A through 2G are flow diagrams illustrating a voice user interface, according to an embodiment of the invention.
Figure 2B:
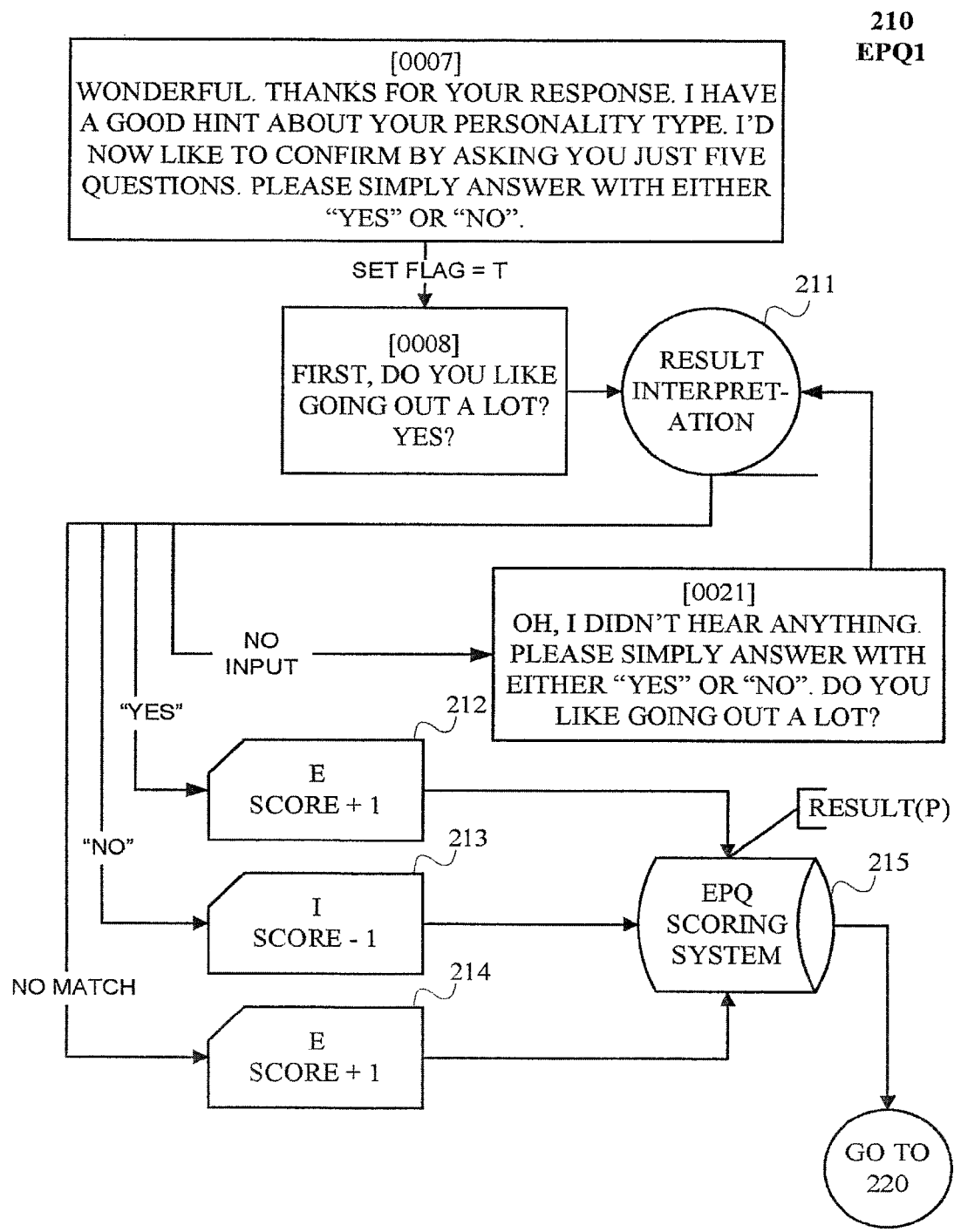
Figure 2C:
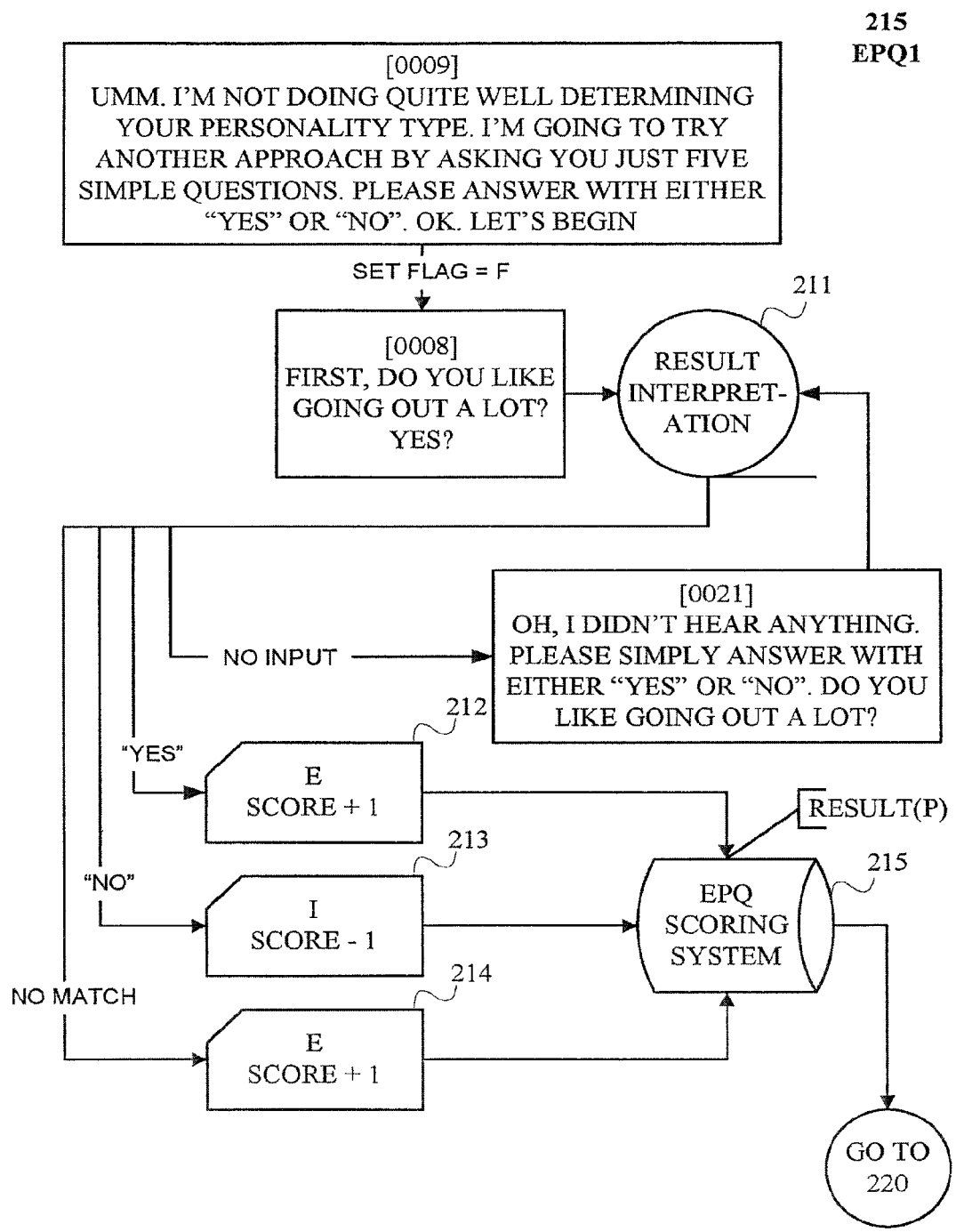

As shown in FIG. 2A, the system outputs welcome message [0001]:

"Hello, I'm an automated persona dialog system. I've been designed to determine your personality type. To do that, I'll need to ask you two separate sets of very simple questions. By the way, I'm still a work in progress so you can help me get better by carefully following my instructions. Now, are you ready to begin?"

The ASR decodes the caller's response (step 201). If the caller says "No" (interpreted to mean that he is not ready to begin), the system outputs message [0004]:

"No problem! Just say "ready" when you want to resume." After waiting two seconds, the system outputs message [0003]:

"This is really fun. Try it! Just say "ready" when you're set to begin."

If no response is received from the caller, the system outputs message [0002]:

"Hmm. I still didn't hear anything. I'll be here if you decide to call back later. Goodbye."

However, assuming a "Yes" from the caller in response to message [0001], or a "Ready" from the caller in response to message [0003] or message [0004], the system outputs initial message [0005]:

"Excellent! Now, please tell me, how would you describe the attributes of the type of job that interests you?"

If the system receives no response, after two seconds (step 202), it outputs message [0006]:

"Oh, I didn't hear anything."

Then, the system outputs retry message [0005]:

"Please briefly tell me how you'd describe the attributes of your ideal job."

The caller's response to message [0005] is decoded by the ASR. Morphological values and syntactic values, as explained above, are computed in accordance with psycholinguistic dictionary engine 203 and then stored along with ASR word count, as linguistic results 204. These linguistic results are referred to as Result (L).

Assuming results were obtainable from the caller utterance, the system progresses to process 210 (FIG. 2A). In process 210, the first personality question (EPQ1) is posed to the caller.

Thus, the system outputs message [0007]:

"Wonderful. Thanks for your response. I have a good hint about your personality type. I'd now like to confirm by asking you just five questions. Please simply answer with either 'yes' or 'no.'"

The system then outputs message [0008]:

"First, do you like going out a lot? Yes?"

The caller's response is decoded and then interpreted (step 211). Depending on the response, a different score is generated. If the caller responds "Yes" to message [0008], then Score+1 (212) is generated and stored in 215. A "Yes" to the question is indicative of an extrovert. If the caller responds "No" to message [0008], then Score−1 (213) is generated and stored in 215. A "No" to the question is indicative of an introvert. If there is no match (system was unable to distinguish a "Yes" or "No"), then Score+1 (214) is generated. It is assumed that anything other than a clear cut "Yes" or "No" is to be interpreted as the caller explaining things about going out, and thus would be indicative of an extrovert.

Again, it is to be understood that the mapping of scores to responses is application-dependent and, thus, the mappings used in this embodiment are for illustrative purposes only.

If no caller input is received in response to the message [0008], the system outputs message [0021]:

"Oh, I didn't hear anything. Please simply answer with either "yes" or "no." Do you like going out a lot?"

The caller's response is then interpreted and scored, as explained above. The scores are cumulatively referred to as Result (P).

Note that if the system did not obtain results from the caller utterance after the linguistic portion of the methodology (FIG. 2A), the system progresses to process 215 (FIG. 2C) and outputs message [0009]:

"Umm. I'm not doing quite well determining your personality type. I'm going to try another approach by asking you just five simple questions. Please answer with either "yes" or "no." Ok. Let's begin."

After that, process 215 follows the same steps as process 210 (FIG. 2B), as explained above.

Figure 2D:
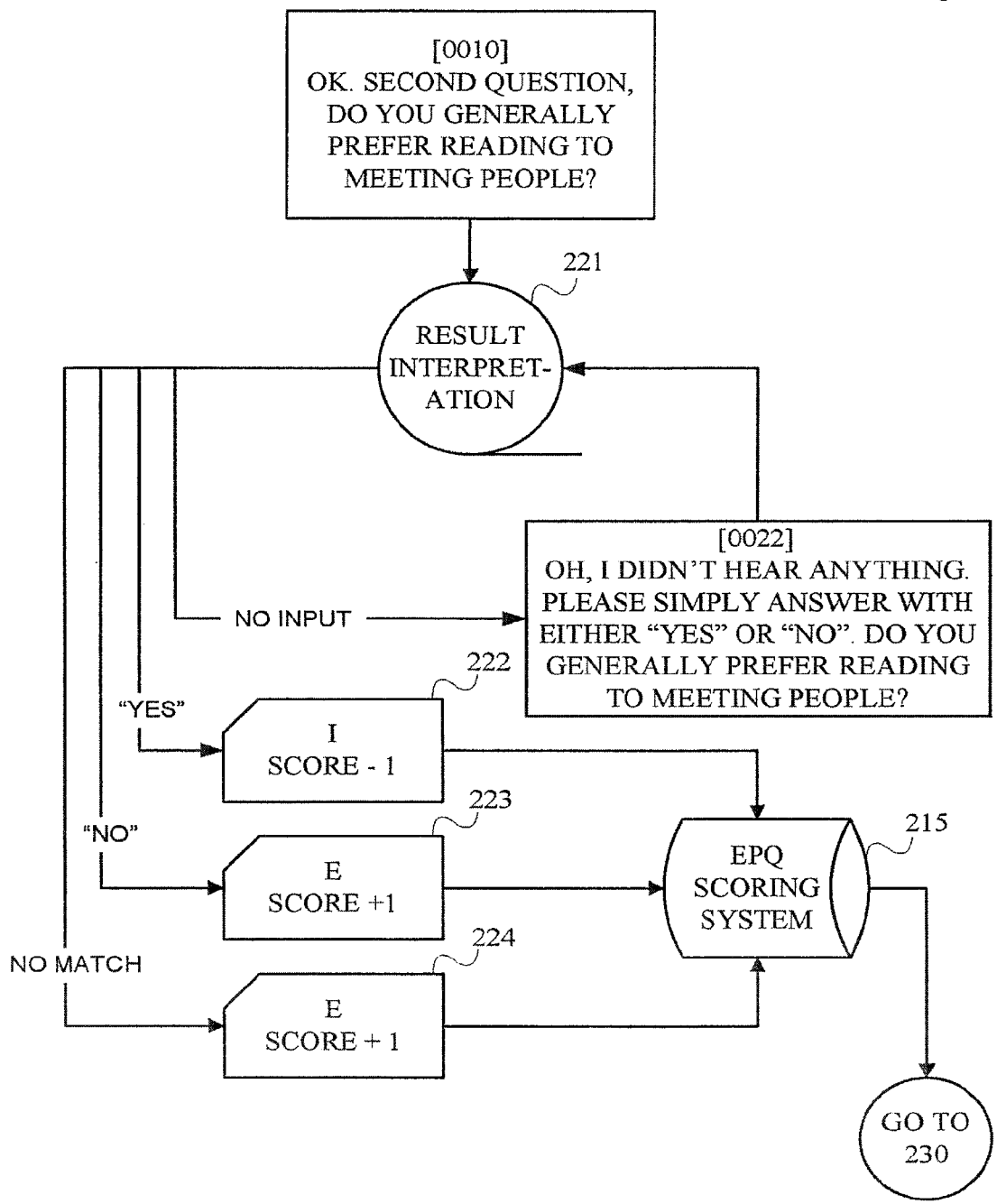

The system then moves onto the second personality question (EPQ2) in process 220 (FIG. 2D).

Thus, the system outputs message [0010]:

"Ok. Second question, do you generally prefer reading to meeting people?"

The caller's response is decoded and then interpreted (step 221). Depending on the response, a different score is generated. If the caller responds "Yes" to message [0010], then Score−1 (222) is generated and stored in 215. A "Yes" to the question is indicative of an introvert. If the caller responds "No" to message [0010], then Score+1 (223) is generated and stored in 215. A "No" to the question is indicative of an extrovert. If there is no match (system was unable to distinguish a "Yes" or "No"), then Score+1 (224) is generated. It is assumed that anything other than a clear cut "Yes" or "No" is to be interpreted as the caller explaining things about reading versus meeting people, and thus would be indicative of an extrovert.

If no caller input is received in response to the message [0010], the system outputs message [0022]:

"Oh, I didn't hear anything. Please simply answer with either "yes" or "no." Do you generally prefer reading to meeting people?"

The caller's response is then interpreted and scored, as explained above. The scores are cumulatively referred to as Result (P).

Figure 2E:
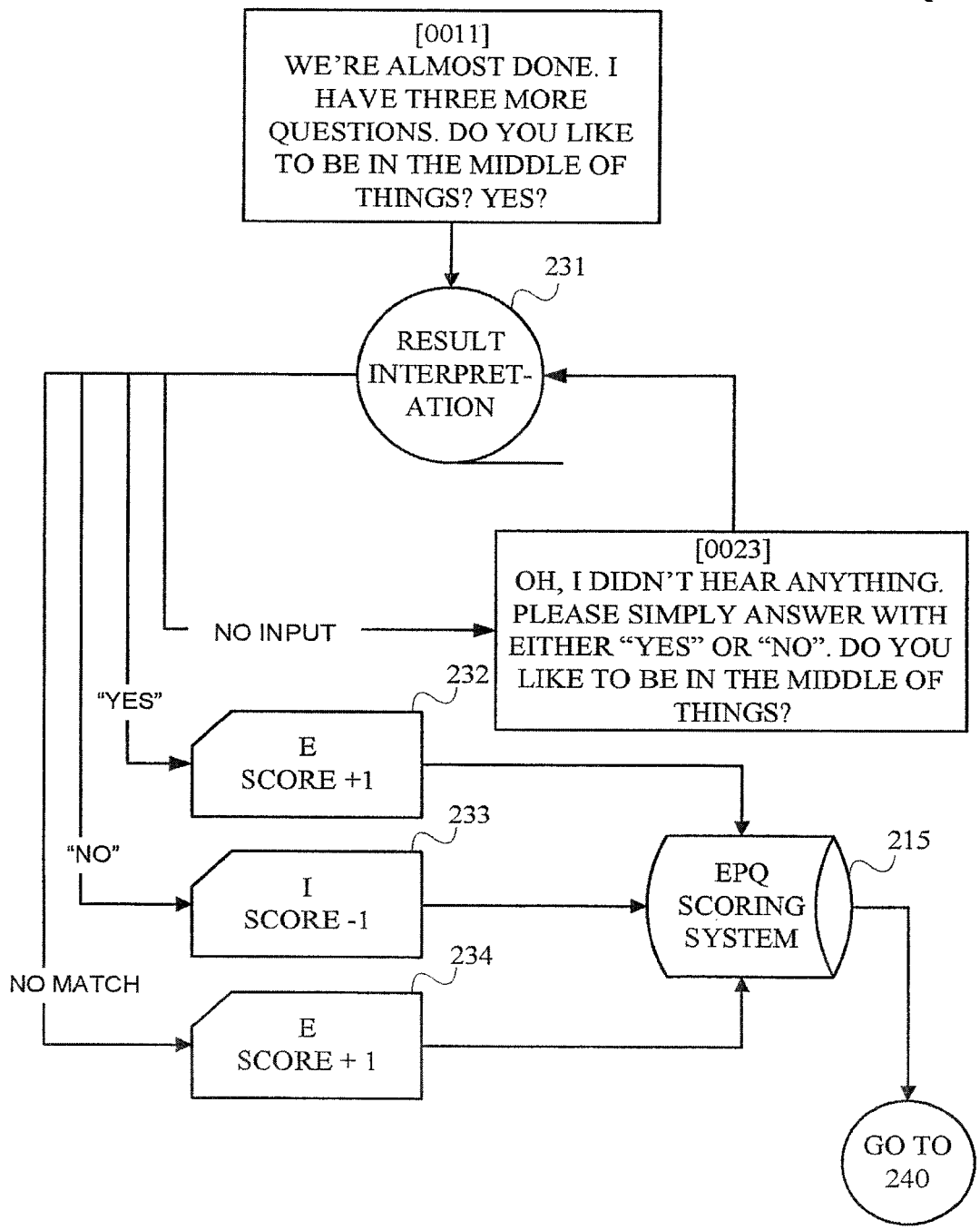

The system then moves onto the third personality question (EPQ3) in process 230 (FIG. 2E).

Thus, the system outputs the message [0011]:

"We're almost done. I have three more questions. Do you like to be in the middle of things? Yes?"

The caller's response is decoded and then interpreted (step 231). Depending on the response, a different score is generated. If the caller responds "Yes" to message [0011], then Score+1 (232) is generated and stored in 215. A "Yes" to the question is indicative of an extrovert. If the caller responds "No" to message [0011], then Score−1 (233) is generated and stored in 215. A "No" to the question is indicative of an introvert. If there is no match (system was unable to distinguish a "Yes" or "No"), then Score+1 (234) is generated. It is assumed that anything other than a clear cut "Yes" or "No" is to be interpreted as the caller explaining how he likes to be involved in things, and thus would be indicative of an extrovert.

If no caller input is received in response to the message [0011], the system outputs message [0023]:

"Oh, I didn't hear anything. Please simply answer with either "yes" or "no." Do you like to be in the middle of things?"

The caller's response is then interpreted and scored, as explained above. The scores are cumulatively referred to as Result (P).

Figure 2F:
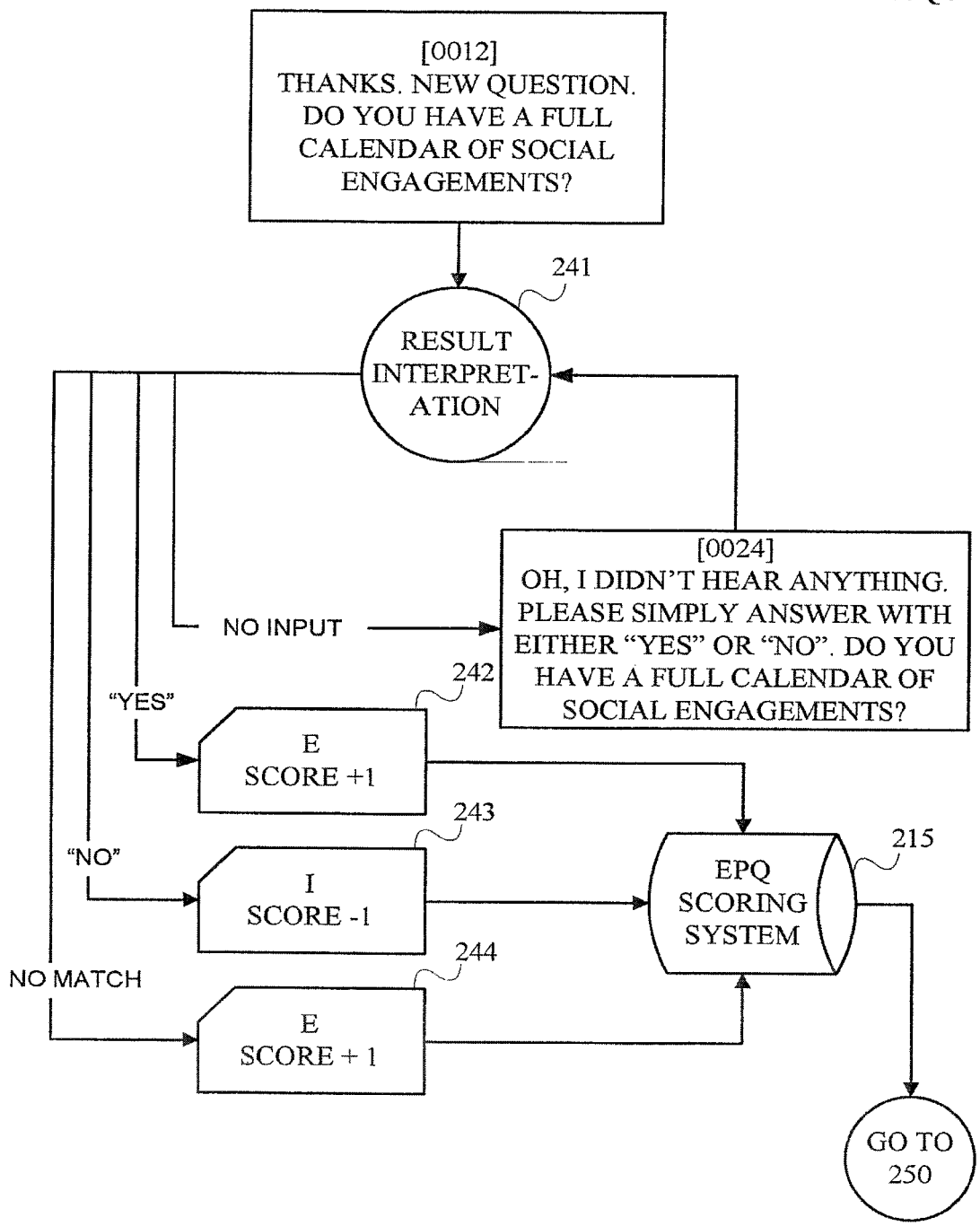

The system then moves onto the fourth personality question (EPQ4) in process 240 (FIG. 2F).

Thus, the system outputs the message [0012]:

"Thanks. New question. Do you have a full calendar of social engagements?"

The caller's response is decoded and then interpreted (step 241). Depending on the response, a different score is generated. If the caller responds "Yes" to message [0012], then Score+1 (242) is generated and stored in 215. A "Yes" to the question is indicative of an extrovert. If the caller responds "No" to message [0012], then Score−1 (243) is generated and stored in 215. A "No" to the question is indicative of an introvert. If there is no match (system was unable to distinguish a "Yes" or "No"), then Score+1 (244) is generated. It is assumed that anything other than a clear cut "Yes" or "No" is to be interpreted as the caller explaining how full his social calendar is, and thus would be indicative of an extrovert.

If no caller input is received in response to the message [0012], the system outputs message [0024]:

"Oh, I didn't hear anything. Please simply answer with either "yes" or "no." Do you have a full calendar of social engagements?"

The caller's response is then interpreted and scored, as explained above. The scores are cumulatively referred to as Result (P).

Figure 2G:
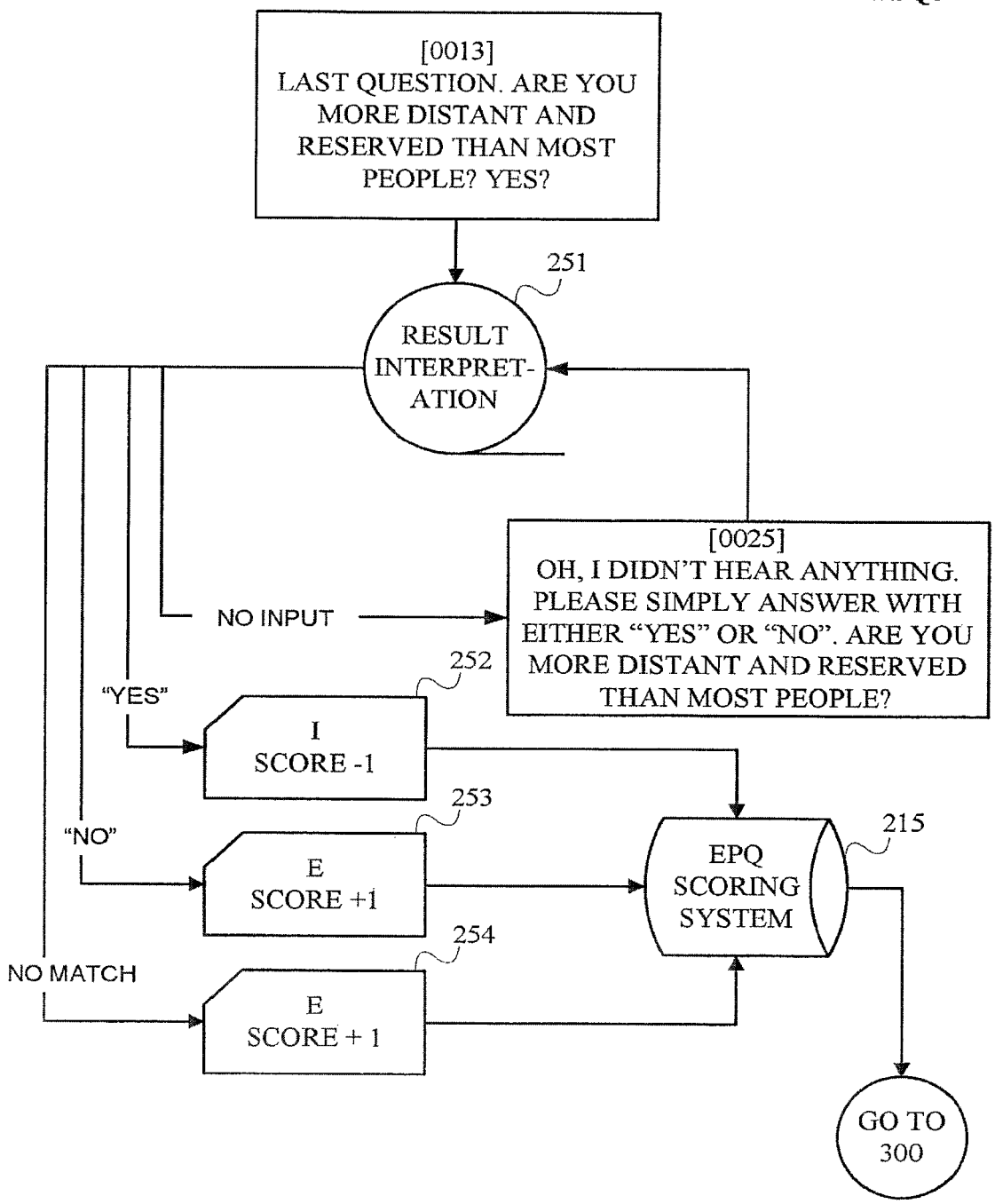

The system then moves onto the fifth personality question (EPQ5) in process 250 (FIG. 2G).

Thus, the system outputs the message [0013]:

"Last question. Are you more distant and reserved than most people? Yes?"

The caller's response is decoded and then interpreted (step 251). Depending on the response, a different score is generated. If the caller responds "Yes" to message [0013], then Score−1 (252) is generated and stored in 215. A "Yes" to the question is indicative of an introvert. If the caller responds "No" to message [0013], then Score+1 (253) is generated and stored in 215. A "No" to the question is indicative of an extrovert. If there is no match (system was unable to distinguish a "Yes" or "No"), then Score+1 (254) is generated. It is assumed that anything other than a clear cut "Yes" or "No" is to be interpreted as the caller explaining why he is not distant or reserved, and thus would be indicative of an extrovert.

If no caller input is received in response to the message [0013], the system outputs message [0025]:

"Oh, I didn't hear anything. Please simply answer with either "yes" or "no." Are you more distant and reserved than most people?"

The caller's response is then interpreted and scored, as explained above. The scores are cumulatively referred to as Result (P).

Figure 3A:
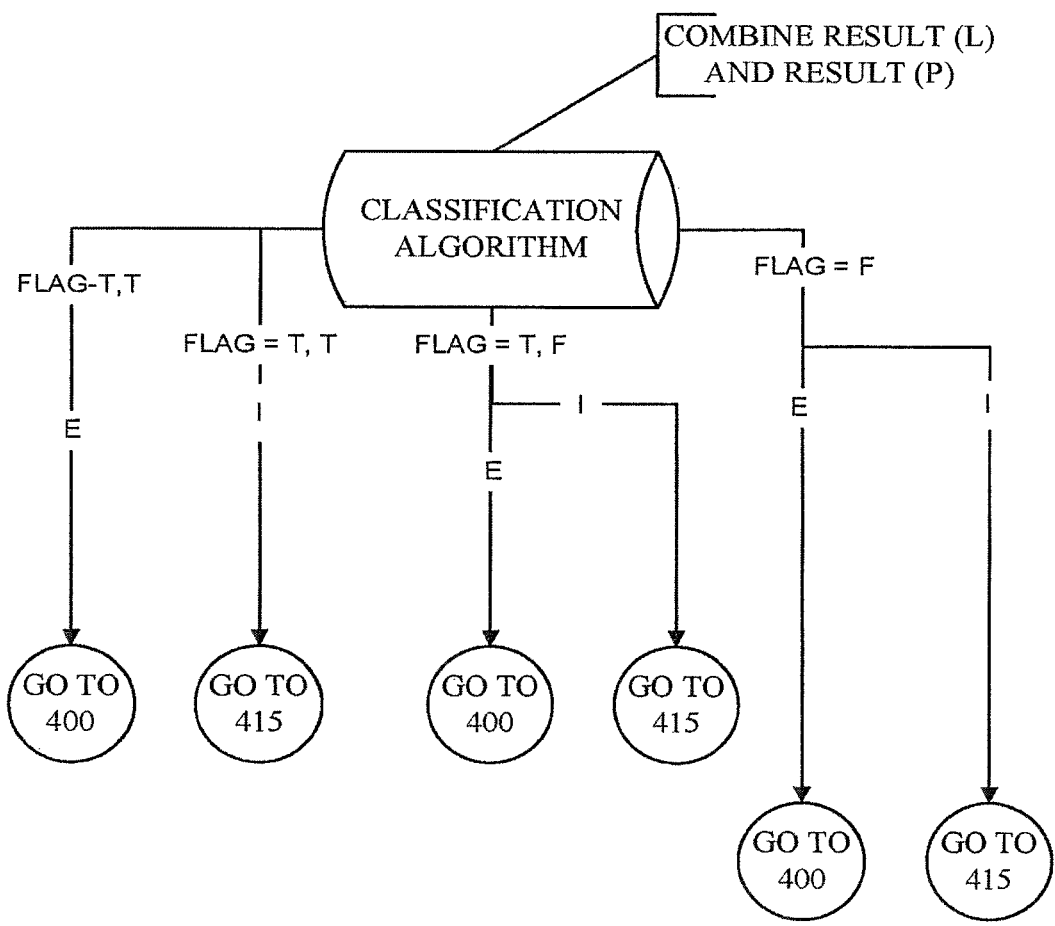
FIGS. 3A through 3C are flow diagrams illustrating a classification and dialogue selection methodology, according to an embodiment of the invention.

Then, as shown in FIG. 3A, Result (P) from the personality questions and Result (L) from the linguistic analysis are combined by classification algorithm 300.

From the received results, the classification algorithm determines, for example, that:

Caller used more words [greater than 15] (this is assigned a score=1, E)

Caller used less compounds [zero] (this is assigned a score=−1, I)

Caller used mainly verbs [3] (this is assigned a score=−1, I)

Caller used locative adverb/pronoun [1] (this is assigned a score=−1, I)

The classification algorithm adds up the values, for example, 1 for E and −3 for I. It is assumed that the classification algorithm employs an interpretation model that equates a user's personality with the greatest value. In this case, it will conclude that the user is an Introvert since there are 3 counts of introvert attributes compared to a single count of extrovert attributes.

If the classification algorithm determines that the caller is an extrovert, then the extrovert dialogue is output (E-Dialogue). On the other hand, if the classification algorithm determines that the caller is an introvert, then the introvert dialogue is output (I-Dialogue).

Figure 3B:
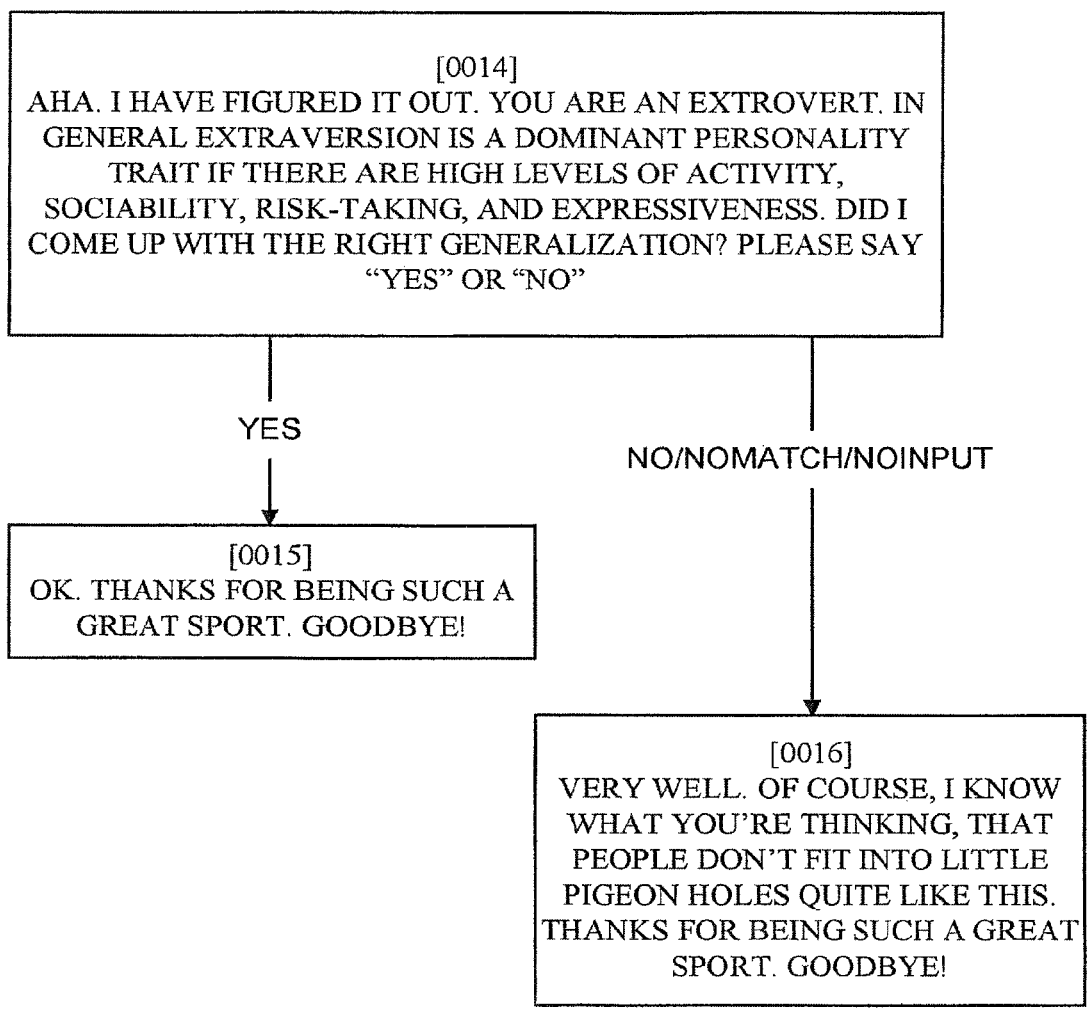

FIG. 3B illustrates an E-Dialogue 400.

The system outputs message [0014]:

"Aha. I have figured it out. You are an extrovert. In general extraversion is a dominant personality trait if there're high levels of activity, sociability, risk-taking, and expressiveness. Did I come up with the right generalization? Please say "yes" or "no.""

If the caller answers "Yes," the system outputs message [0015]:

"Ok. Thanks for being such a great sport. Goodbye!"

If the caller answers "No," or there is no input or no discernable match, then the system outputs message [0016]:

"Very well. Of course, I know what you're thinking that people don't fit into little pigeon holes quite like this. Thanks for being such a great sport. Goodbye!"

Figure 3C:
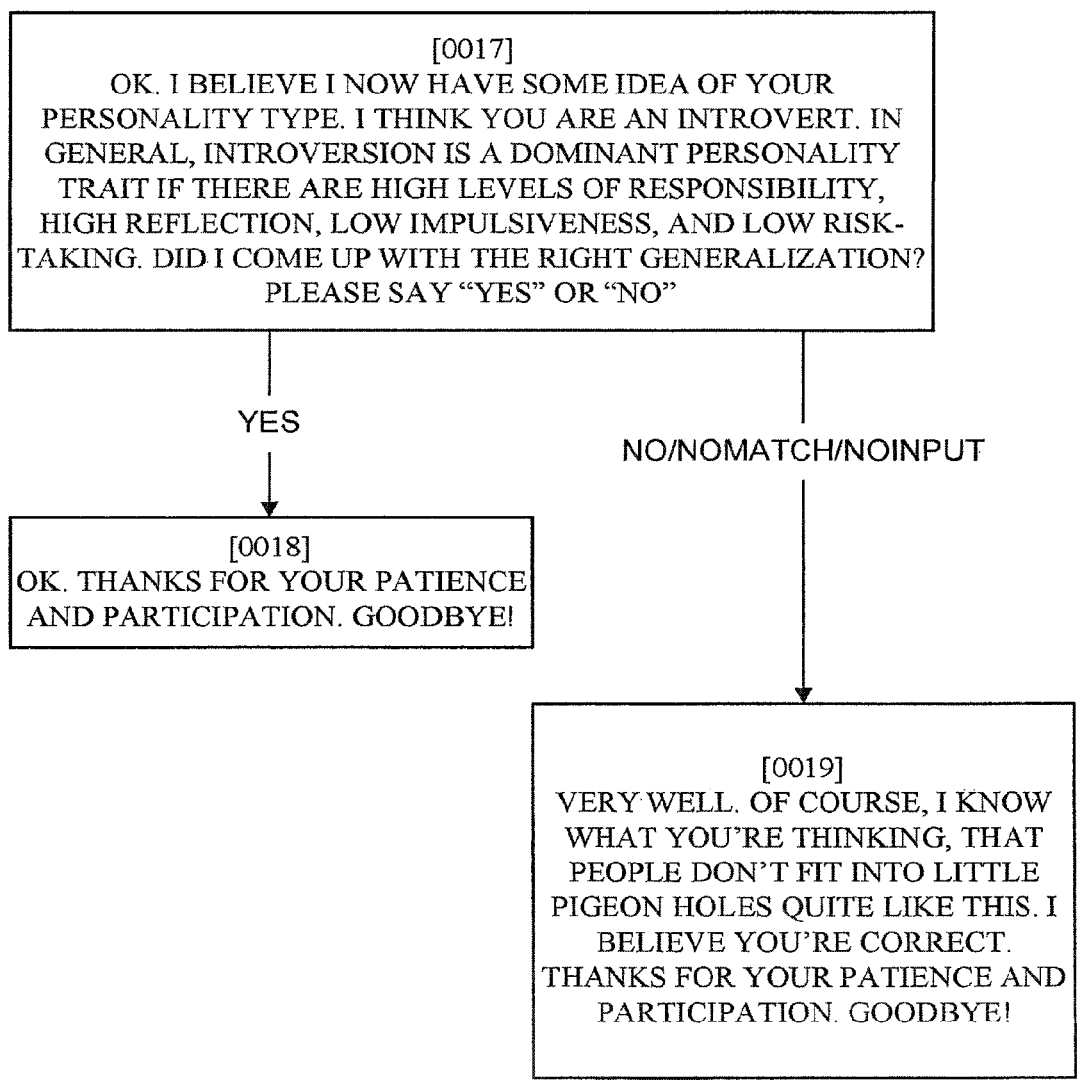

FIG. 3C illustrates an I-Dialogue 415.

The system outputs message [0017]:

"OK. I believe I now have some idea of your personality type. I think you are an introvert. In general, introversion is a dominant personality trait if there are high levels of responsibility, high reflection, low impulsiveness, and low risk-taking. Did I come up with the right generalization? Please say "yes" or "no.""

If the caller answers "Yes," the system outputs message [0018]:

"Ok. Thanks for your patience and participation. Goodbye!"

If the caller answers "No," or there is no input or no discernable match, then the system outputs message [0019]:

"Very well. Of course, I know what you're thinking that people don't fit into little pigeon holes quite like this. I believe you're correct. Thanks for your patience and participation. Goodbye!"

Figure 4:
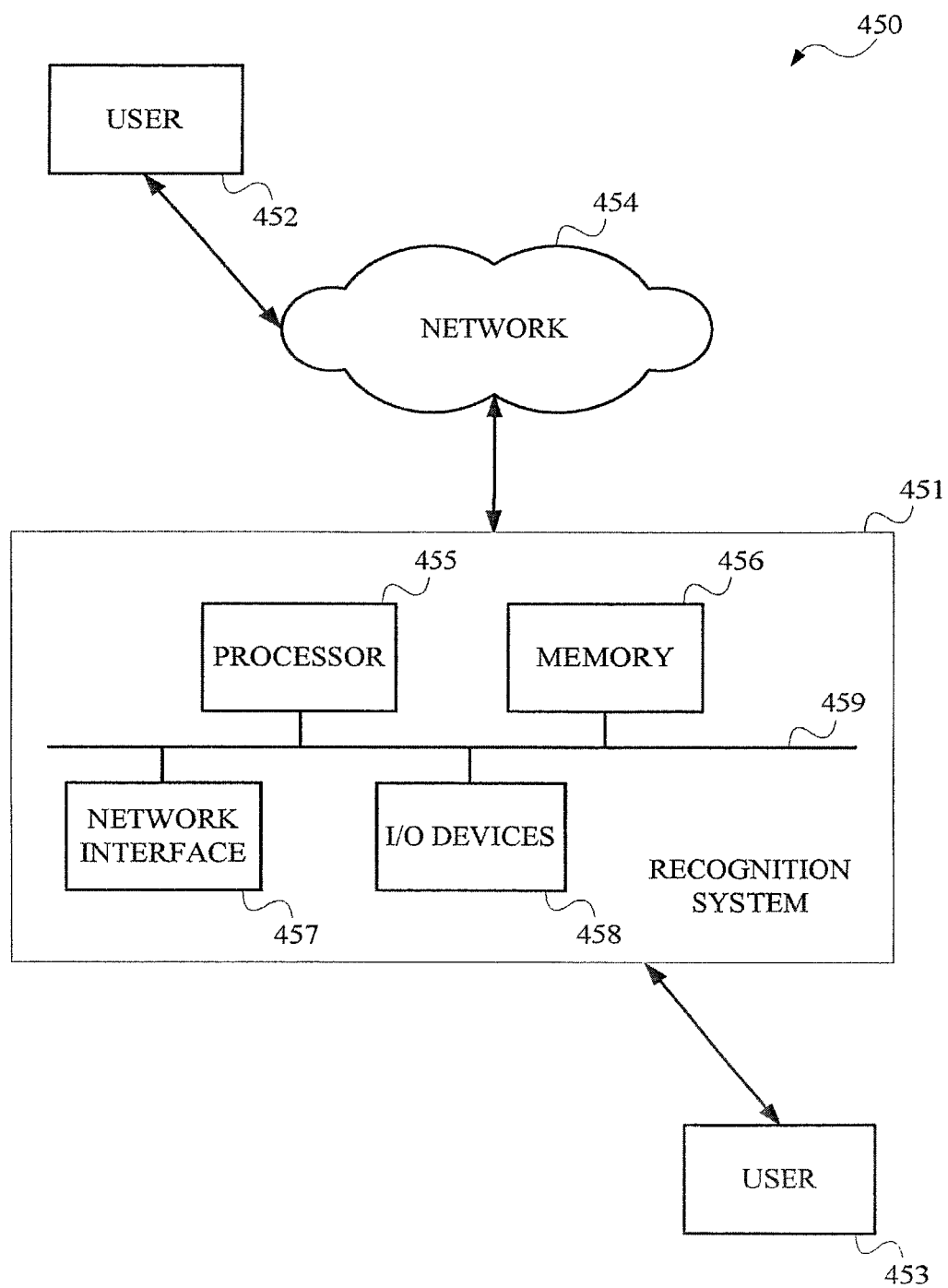
FIG. 4 is a block diagram illustrating a personality recognition system and an environment wherein the system may be implemented, according to an embodiment of the invention.

Referring lastly to FIG. 4, a block diagram illustrates a personality recognition system and an environment wherein the system may be implemented, according to an embodiment of the invention.

As shown in environment 450, personality recognition system 441 is coupled to multiple users (callers). By way of one example, the system is coupled to user 452 via network 454. In another example, the system is coupled to user 453 directly.

Thus, in one example, network 454 may be a phone network (e.g., wireless or wired) and user 452 may include a telecommunication device (e.g., standard telephone, cellular phone, etc.). In another example, network 454 may be a computing network (e.g., Internet, private local area network, etc.) and user 452 may include a computing device (e.g., personal computer, laptop, personal digital assistant, etc.). With regard to user 453, the user may interact with the system directly via one or more microphones and one or more speakers associated with the system. Thus, users can interact with the system either remotely (e.g., user 452) or locally (e.g., user 453).

However, it is to be understood that principles of the invention are not limited to any particular user device or any mechanism for connecting to the system.

As further illustrated in FIG. 4, personality recognition system 451 is implemented via a computing system in accordance with which one or more components/steps of the personality recognition techniques and voice user interface described herein (e.g., components and methodologies described in the context of FIGS. 1, 2A through 2G, and 3A through 3C) may be implemented, according to an embodiment of the present invention. It is to be understood that the individual components/steps may be implemented on one such computing system or on more than one such computing system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computing system shown in FIG. 4 may represent one or more servers or one or more other processing devices capable of providing all or portions of the functions described herein.

As shown with respect to system 451, the computing system architecture may comprise a processor 455, a memory 456, a network interface 457, and I/O devices 458, coupled via a computer bus 459 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., microphones, keyboard, mouse, etc.) for entering data to the processing unit (e.g., receiving caller utterances), and/or one or more output devices (e.g., speaker, display, etc.) for presenting results associated with the processing unit (e.g., outputting system messages).

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of operating a voice user interface, the method comprising:
customizing, for a user, one or more audio prompts presented to the user via the voice user interface based at least in part on at least one spoken utterance of the user, wherein customizing the one or more audio prompts based at least in part on the analysis comprises:
recognizing a personality trait associated with the user through analysis of the at least one spoken utterance of the user, wherein recognizing the personality trait comprises:
receiving at least one morphological attribute of a plurality of words spoken by the user in the at least one spoken utterance, the at least one morphological attribute comprising a number of compound words that are in the plurality of words; and
determining the personality trait associated with the user based at least in part on the at least one morphological attribute of the plurality of words spoken by the user, wherein the determining comprises determining whether the number of compound words exceeds a threshold; and
selecting, based at least in part on the personality trait, between presenting a first audio prompt or a second audio prompt via the voice user interface; and
outputting the one or more audio prompts, customized for the user, for presentation to the user via the voice user interface.

2. The method of claim 1, further comprising:
receiving the at least one spoken utterance of the user; and
performing automated speech recognition on the at least one spoken utterance.

3. The method of claim 1, further comprising:
receiving at least one syntactic attribute associated with the plurality of words, the at least one syntactic attribute comprising a part of speech in at least one of the plurality of words,
wherein receiving the at least one morphological attribute comprises receiving a number of words that are in the plurality of words, and
wherein determining the personality trait associated with the user further comprises:
determining whether the number of words of the plurality of words exceeds a second threshold value; and
for the part of speech of the at least one of the plurality of words, determining whether a number of occurrences of the part of speech in the plurality of words exceeds a third threshold value associated with the part of speech.

4. The method of claim 1, further comprising:
identifying at least one personality question to be posed to the user, the at least one personality question comprising a first question,
wherein:
the first question of the at least one personality question is associated with a set of expected answers, and
at least some answers, of the set of expected answers associated with the first question, are each associated with a personality trait.

5. The method of claim 4, further comprising:
posing the identified at least one personality question to the user; and
receiving a response to each personality question of the at least one personality question,
wherein determining the personality trait further comprises determining the personality trait based at least in part on the response to each personality question of the at least one personality question.

6. At least one non-transitory computer-readable storage medium having encoded thereon executable instructions that, when executed by at least one processor, cause the at least one processor to carry out a method of operating a voice user interface, the method comprising:
customizing, for a user, one or more audio prompts presented to the user via the voice user interface based at least in part on at least one spoken utterance of the user, wherein customizing the one or more audio prompts based at least in part on the analysis comprises:
recognizing a personality trait associated with user through analysis of the at least one spoken utterance of the user, wherein recognizing the personality trait comprises:
receiving at least one morphological attribute of a plurality of words spoken by the user in the at least one spoken utterance, the at least one morphological attribute comprising a number of compound words that are in the plurality of words; and
determining the personality trait associated with the user based at least in part on the at least one morphological attribute of the plurality of words spoken by the user, wherein the determining comprises determining whether the number of compound words exceeds a threshold; and
selecting, based at least in part on the personality trait, between presenting a first audio prompt or a second audio prompt via the voice user interface; and
outputting the one or more audio prompts, customized for the user, for presentation to the user via the voice user interface.

7. An apparatus comprising:
at least one processor; and
at least one computer-readable storage medium having encoded thereon executable instructions that, when executed by the at least one processor, cause the at least one processor to carry out a method operating a voice user interface, the method comprising:
customizing, for a user, one or more audio prompts presented to the user via the voice user interface based at least in part on at least one spoken utterance of the user, wherein customizing the one or more audio prompts based at least in part on the analysis comprises:
recognizing a personality trait associated with the user through analysis of the at least one spoken utterance of the user, wherein recognizing the personality trait comprises:
receiving at least one morphological attribute of a plurality of words spoken by the user in the at least one spoken utterance, the at least one morphological attribute comprising a number of compound words that are in the plurality of words; and
determining the personality trait associated with the user based at least in part on the at least one morphological attribute of the plurality of words spoken by the user, wherein the determining comprises determining whether the number of compound words exceeds a threshold; and
selecting, based at least in part on the personality trait, between presenting a first audio prompt or a second audio prompt via the voice user interface; and
outputting the one or more audio prompts, customized for the user, for presentation to the user via the voice user interface.

8. The method of claim 1, further comprising:
following the determining of the personality trait, presenting a dialog to the user via the user interface, wherein the dialog comprises the first audio prompt or the second audio prompt selected based at least in part on the personality trait.

9. The method of claim 2, wherein:
performing the automated speech recognition on the at least one spoken utterance comprises generating the plurality of words, and
the method further comprises analyzing the plurality of words to generate the at least one morphological attribute.

* * * * *